United States Patent [19]
Ririe et al.

[11] 3,780,947
[45] Dec. 25, 1973

[54] MOBILE IRRIGATION APPARATUS AND ALIGNMENT CONTROL

[75] Inventors: Max H. Ririe, Gering; Murray C. Roland; Rich Olson, both of Scottsbluff, all of Nebr.

[73] Assignee: Lockwood Corporation, Gering, Nebr.

[22] Filed: Mar. 24, 1972

[21] Appl. No.: 237,692

Related U.S. Application Data

[63] Continuation-in-part of Ser. No. 129,793, March 31, 1971, Pat. No. 3,712,544.

[52] U.S. Cl.................. 239/177, 137/344, 239/212
[51] Int. Cl................................................ B05b 3/00
[58] Field of Search........................... 239/177, 212; 137/344

[56] References Cited
UNITED STATES PATENTS
| | | | |
|---|---|---|---|
| 3,373,939 | 3/1968 | Dowd | 239/177 |
| 3,353,751 | 11/1967 | Dowd | 239/177 |
| 3,533,556 | 10/1970 | Dowd | 239/177 |
| 3,623,663 | 11/1971 | Koinzan | 239/177 |

Primary Examiner—M. Henson Wood, Jr.
Assistant Examiner—Michael Mar
Attorney—McDougall, Hersh & Scott

[57] ABSTRACT

A mobile irrigation system which makes use of an elongate water distributor pipe mounted upon support towers for movement over terrain in which switch actuating means in each of the control towers is stabilized to minimize inadvertent movements and adjusted to compensate for wind effect with the result that better alignment is achieved between towers.

8 Claims, 6 Drawing Figures

MOBILE IRRIGATION APPARATUS AND ALIGNMENT CONTROL

This application is a continuation-in-part of our copending application filed concurrently herewith and entitled "Tower Alignment and Safety Control for Mobile Irrigation Systems" and of our copending application Ser. No. 129,793, filed Mar. 31, 1971 now U.S. Pat. No. 3,712,544, entitled "Alignment Means for Mobile Irrigation Apparatus".

This invention relates to a self-propelled sprinkling system for irrigating large areas from a central source of water supply and it relates more particularly to a means for maintaining proper alignment of self-propelled units embodied in the system and control means for the same.

Self-propelled sprinkling systems for irrigation of large areas are well known. In general, use is made of a main distributor pipe, which may be as much as one-half mile in length, with the inner end portion of the pipe connected to a source of water for the supply of water under pressure to sprinkling heads spaced along the length of the pipe to dispense the water onto crops in the field that is covered by the sprinkling system.

The distributor pipe can be adapted to move across the field in a substantially straight line, but it is usually mounted for rotational movement about a central pivot with the pivot end connected to the water supply. The distributor pipe is supported on a plurality of independently driven support towers located at spaced intervals along the length of the distributor pipe and which operate to carry the pipe across the field. Typical systems are illustrated in U.S. patents to Zyback, U.S. Pat. No. 2,604,359; Behlen, U.S. Pat. No. 2,726,895; Bower et al., U.S. Pat. No. 3,394,729; and the Curtis U.S. Pat. Nos. 3,352,403 and 3,352,493.

In a system of the type described, it is important to minimize the amount of bending of the distributor pipe during its travel across the field. As a result, it is desirable to maintain some degree of alignment between the self-propelled support towers on which the distributor pipe is carried.

In our aforementioned copending applications, description is made of means for controlling the operation of the drives for the individual towers for maintaining alignment between the towers and minimize bending of the elongate distributor pipe as it is carried by the towers for traverse over the ground. As described, such means includes use of a control wire which stretches continuously from an outermost tower, which is constantly driven, to the fixed pivot at the inner end of the water distributor pipe, and in which the control wire is threaded through a pendulum suspended at each tower for rocking movement responsive to misalignment between towers, into and out of engagement with switch members controlling the operation of the tower drives.

When the switch means are arranged in the arcuate path of the pendulum for proper engagement and when use is made of a single wire for both alignment and as a safety wire for shutdown of the entire system in response to excessive misalignment between towers, the major movement is along a vertical segment of the arc with very little movement in the horizontal direction with the result that the horizontal distance between the alignment switch and the safety contacts is insufficient for effective control.

Lack of effective control also results from the effect of the wind on the position of the control wire and from the suspension of the pendulum which enables free swinging movement into and out of engagement with the switch means.

Thus, it is an object of this invention to provide improvements in the control means whereby arcuate movement of the pendulum is transmitted into substantially linear horizontal movement with the responsive switch means arranged in the desired spaced apart relation along the path of such linear movement for more effective control, in which movement responsive to deviation in position of the control wire is dampened to introduce greater stability in operation and control, and in which means are provided to compensate for the "wind effect" on the control wire, whereby better alignment between towers can be maintained.

These and other objects and advantages of this invention will hereinafter appear and for purposes of illustration, but not of limitation, an embodiment of the invention is shown in the accompanying drawings, in which FIG. 1 is a perspective view of segments of the mobile irrigation system embodying the features of this invention;

Figure 6:
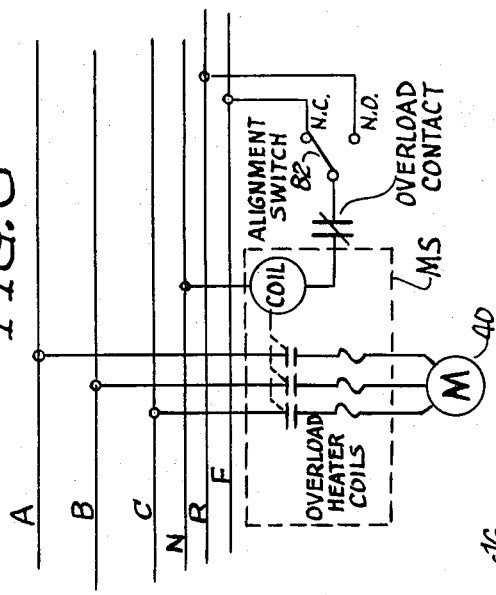
FIG. 6 is an elevational diagram for the control unit.
Figure 1:
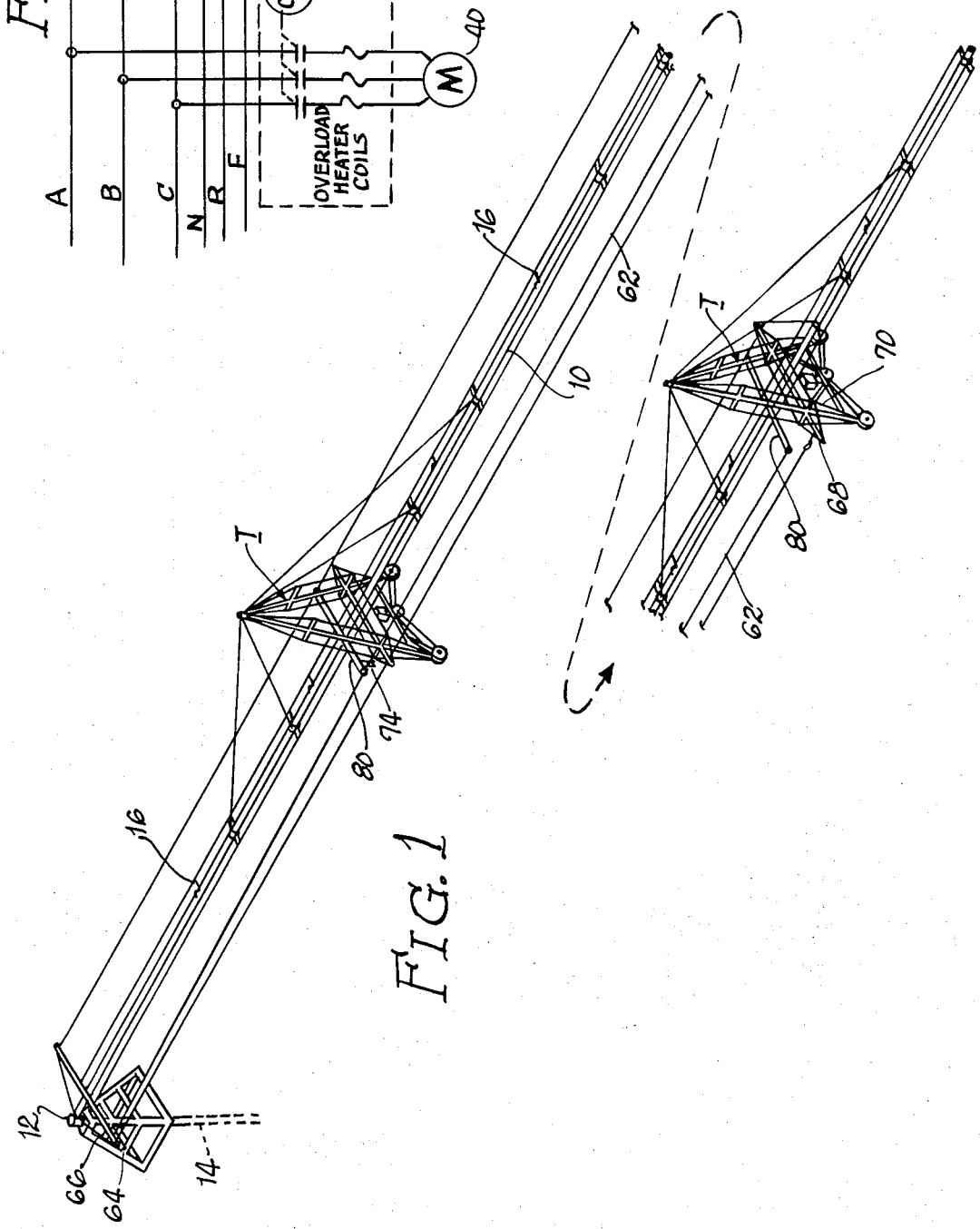

The invention will be described with reference to an irrigation system wherein the distributor pipe radiates about a central pivot but it will be understood that the concepts for alignment control between the mobile towers can be adapted in a system wherein the mobile support units are intended to travel in a straight line for unidirectional transport of the transmission line over all or a segment of the field. The invention will also be described with reference to the use as a control of the outermost of the mobile units in which the driving motor is adapted continuously to operate for movement of the outer mobile tower in the prescribed line of travel over the field but it will be understood that one or more other mobile units may be used as the control. It will be understood that the invention has application to sprinkling systems in which the distributor pipe is formed of a continuous section or of separate sections with flexible connections.

Referring now to the drawings for a description of the invention, the numeral 10 indicates the elongate horizontally disposed water distribution pipe which is provided with a swivel connection 12 at its inner end for pivotal attachment to the upper end of a feed pipe 14 which may extend downwardly to a well in the ground or which is otherwise supplied with water under pressure for irrigation, as from a stream, well or other source of water. Thus the feed pipe 14 represents the axis about which the water distributor pipe turns. Other means for pivotal attachment in sealing engagement between the distributor pipe and the feed pipe are well known by reason of the widespread utilization of such an arrangement in commercial practice, as illustrated in the aforementioned patents.

The distributor pipe 10 is provided with a plurality of spray nozzles 16 at frequently spaced intervals along the length of the pipe for operation as overhead sprays to sprinkle water onto the crop as the distributor pipe moves about the feed at its axis. The distributor pipe is supplied with water under pressure, as by means of a water pump connected with a supply pipe or water tower.

A number of mobile towers T are arranged in longitudinally spaced apart relation along the length of the distributor pipe with means for engaging the adjacent portions of the pipe for support. The number of mobile towers T can be varied depending somewhat upon the spaced relationship between supports and the length of the distributor pipe. The distributor pipe 10 can be suspended from the support by means of a cable so as to be carried by the support. It can rest on the tower as on a cradle rigidly secured to the support but, in accordance with the preferred practice of this invention, the distributor pipe 10 is rigidly connected with the support tower as by means of suitable straps 18 and struts 20.

The mobile tower is not a critical element of the invention since mobile towers of various constructions generally employed in the trade may be used. As a result, while the invention will be described with reference to a representative tower assembly, it will be understood that towers of different structures may be used.

Figure 2:
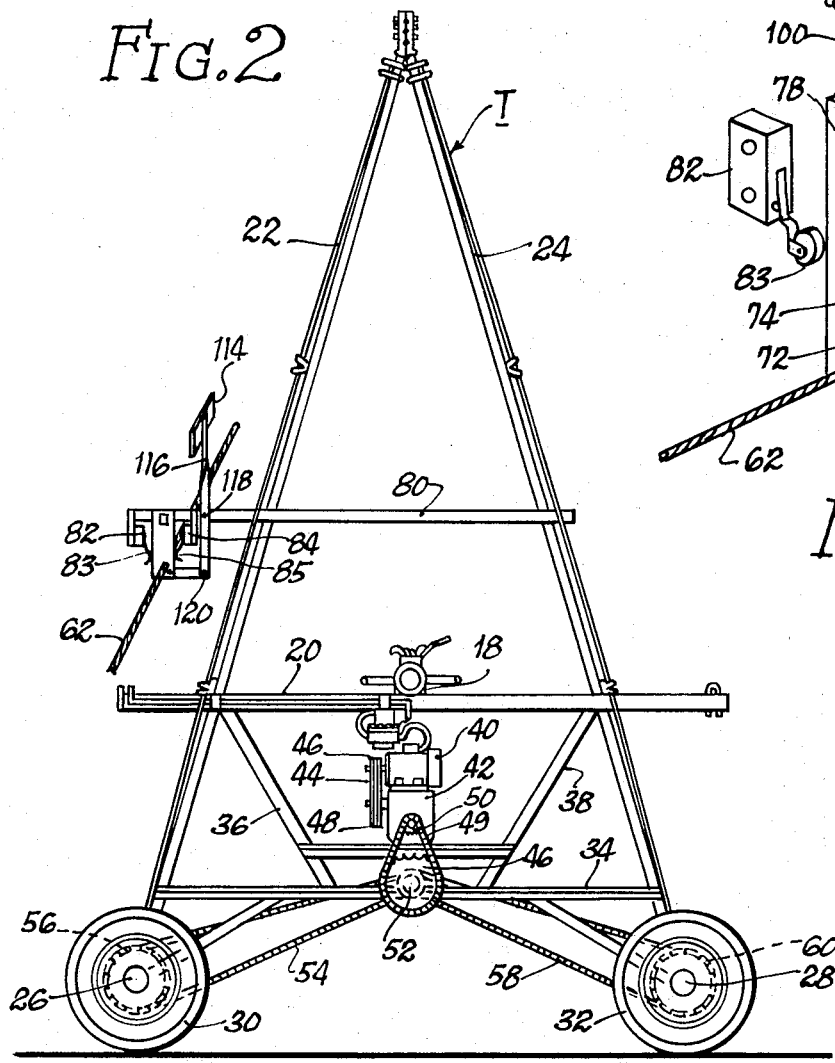
FIG. 2 is an elevational view of a single intermediate support tower.

Each mobile tower is of substantially the same construction such that only one such representative mobile tower need be described in detail. Referring to FIG. 2 of the drawings, the mobile tower includes a vertically disposed A frame formed of legs 22 and 24 with bearings provided at their lower end portions having journals for receiving stub shafts 26 and 28 on which land-engaging wheels 30 and 32 respectively are mounted for wheeled support of the tower.

The legs 22 and 24 of the A frame are bracked by one or more cross brace members 34 and 20 as well as struts 36 and 38 to provide a rigid structure of high structural strength. Supported between the cross brace members on the A frame is an electrical driving motor 40 which is operatively connected to a speed reducer 42, as by means of a driving belt or chain 44 which operates about a sprocket 46 on the end of the motor shaft and another sprocket 48 on the ingoing shaft of the speed reducer. The speed reducer is connected to the land-engaging wheels 30 and 32 for the transmission of rotational movement to the wheels. In the illustrated modification such transmission from the speed reducer to the wheels is effected by means of a sprocket 46 mounted for free rotational movement on the cross brace member 34 of the A frame and which is adapted to be driven by the speed reducer through a chain 49 trained about a spur gear 50 fixed to the outgoing end of the speed reducer shaft and sprocket 46. A shaft 52 rigid with the sprocket 46 is operatively connected to the wheel 30 through a driving chain 54 having one end trained about a spur gear on the shaft 52 while the other end is trained about a sprocket 56 fixed to the stub shaft 26 on which the wheel 30 is mounted. The wheel 32 is similarly driven for rotational movement in the same direction as by means of a chain 58 trained about another spur gear on the shaft 52 and a sprocket 60 fixed to the shaft on which the wheel 32 is mounted.

The driving motor 40 is a reversible motor so that the mobile tower can be interchangeably driven in one direction or the other. Thus, responsive to rotation of the motor in one direction, the reducing gear 42 will be turned in one direction to cause the land-engaging wheels to both turn in the same direction and propel the mobile tower over the ground. Reversal of the driving motor will cause the land-engaging wheel to turn in the opposite direction together to reverse the direction of movement of the mobile towers.

Thus the direction of tower movement (forward or reverse) is controlled by the direction of rotation of the driving motor (clockwise or counterclockwise). Motor rotation is, in turn, determined by the respective phase relation of the electrical power. The motor 40 is energized by the operation of the magnetic motor starter MS and is protected from accidental overload and subsequent damage by the overload current devices such as overload heater coils of the magnetic motor starter. The alignment switch, hereinafter described, controls the operation of the magnetic motor starter and subsequently the movement of the tower itself.

In the illustrated modification, the motor 40 is a three phase motor connected to a three phase power supply including phase lines A, B and C, while the magnetic motor starter is controlled via the alignment switch 82 by the control power lines identified in the drawings as the common neutral line N, reverse control line R, and forward control line F.

In the preferred construction, the driving motor on the outermost tower TO is connected for continuous or intermittent operation, depending on desired operational speed, in one direction or the other, as selected by the operator or by suitable switching mechanisms. Operation of the driving motors of the intermediate towers depends upon the relative position of the intermediate towers with respect to the outer tower as the control.

As described in the aforementioned copending application, such automatic alignment means comprises a flexible cable 62 which is fixed at its inner end 64 to an arm 66 which extends laterally from the pivot while the outer end 68 is fixed to the end portion of a laterally extending cross beam 70 on the outermost tower so that the flexible cable 62 will extend in essentially a straight line from said pivot to said outermost tower.

Figure 3:
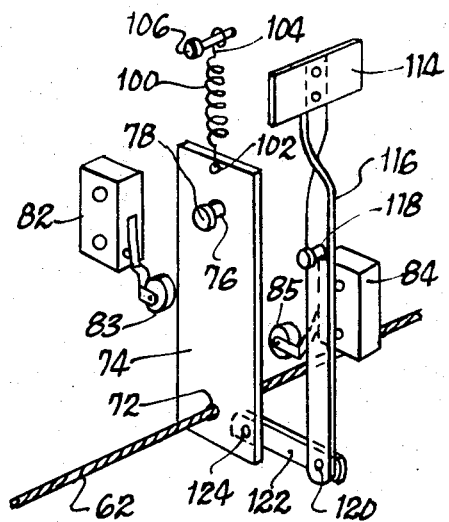
FIG. 3 is a perspective elevational view of one embodiment of a pendulum arrangement for switch control, as described in the aforementioned copending application.
Figure 4:
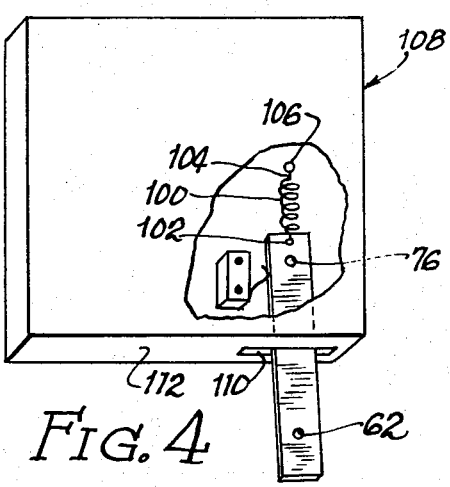
FIG. 4 is an elevational view of a tower control box showing the spring stabilizer embodying the features of this invention.

The flexible cable is threaded through an opening 72 in a pendulum 74 that is mounted on each of the intermediate towers for free rocking movement about an axis 76 which is parallel with the axis of the pipe and in a direction crosswise of the distributor pipe. As illustrated in FIGS. 2 and 3, the pendulum 74 comprises an elongate member which is suspended to depend from the tower on a pivot pin 78 extending laterally from the end portion of a horizontally disposed cross brace member 80 rigid with the tower. The pendulum is supported on the tower at a level high enough to enable the flexible cable easily to clear the crops so that the growing crops will not interfere with the function of the cable as an alignment control. An electrical switch 82 is fixed to the cross brace member 80 with the plunger positioned in the pathway of the swinging pendulum 74.

As illustrated in FIG. 3, the common line N is connected to one terminal of the magnetic motor starter while the forward control line is connected to one pole of the switch which, when the switch is closed, establishes connection with the other pole of the relay to effect operation for forward movement of the tower and which, when open, disengages the forward control wire from the magnetic motor starter to stop operation thereof. The reverse control line is connected to the other pole of the switch or preferably to a separate switch mechanism 84 located inwardly of the pendulum and with the same connection whereby, when the switch 84 is closed, connection is established between the reverse control line and the magnetic motor starter to effect operation in the reverse direction and, when the switch is open, the reverse control line is disconnected from the motor to terminate the operation thereof.

Thus, when the intermediate mobile tower is in proper alignment, the pendulum will be suspended from its pivot to hang downwardly substantially perpendicularly so that the pendulum will be free of the plunger of switch 82 as well as the plunger of switch 84.

When the forward control line F is the hot line for forward movement of the mobile tower and the pendulum hangs downwardly out of engagement with the plunger 83 of the switch 82, a voltage is applied between the forward control line F and the common or neutral wire N, with the switch in the normally closed (NC) position. The three phase power is energized with the phase relation A-B-C to effect operation for corresponding forward movement of the mobile tower along with the outermost tower. As long as alignment continues and the pendulum 74 hangs free of the plunger 83 of switch 82, the motor 40 will continue to operate to effect forward movement of the tower.

If the particular tower advances to a position of misalignment, the cable will cause the pendulum to rock about its pivot in the clockwise direction until the pendulum engages the plunger. Engagement of the plunger operates to open the switch 82 and disconnect the forward control line F from the neutral common control line to terminate the passage of voltage therebetween. This causes an interruption in the magnetic motor starter circuit and the driving motor 40 is de-energized.

Operation of the motor and forward movement of the mobile tower will be thus discontinued as long as the pendulum engages the plunger 83 to make the switch. As the outer tower continues to move forwardly, while the intermediate tower is stationary, the cable will move forwardly with the outer mobile unit ultimately to cause the pendulum to rock forwardly about its pivot into a position out of engagement with the plunger 83. This will occur when the outer mobile unit reaches substantial alignment with the stopped intermediate mobile tower. This will release the plunger for return of the switch to NC position whereby the driving mechanism will commence operation again to effect forward movement of the intermediate mobile tower with the continued forward movement of the outer control unit.

This sequence will repeat as often as is necessary to keep the tower "in-line" with the other respective towers.

If reverse operation is desired, a voltage is applied between the reverse control wire (R) and the common or neutral (N). The three phase motor is energized with the phase relation C-B-A. This change in relationship will cause the driving motor to run in the reverse direction.

When operating in the reverse direction the switch is in the normally open position (NO) whereby a circuit is established between the reverse control wire R and the neutral N to cause operation of the driving motor in the reverse direction. This situation will continue as long as the tower is in-line so that the pendulum hangs free of the plunger 85. As the tower advances beyond the adjacent towers or beyond the outer control tower, the control cable causes the pendulum to rock in the counterclockwise direction about its pivot until it engages the plunger 85 and breaks the circuit when the out-of-alignment becomes excessive.

This breaks the circuit between the line R and N to discontinue operation of the motor.

As the adjacent towers or outer control tower catch up to bring about the in-line arrangement, the pendulum swings clockwise to release the plunger 85 for return of the switch to normal open position for re-energization of the motor with corresponding reverse movement of the tower.

This sequence will repeat as often as is necessary to keep the tower in-line with the other respective towers.

The stabilization of the pendulum 74 to dampen rocking movement is achieved, in accordance with one concept of this invention, by means for generating increase in tension responsive to deviation of the pendulum from the normal vertical position relative to its pivot 76. For this purpose, use is made of a coil spring 100 having one end 102 connected to the pendulum 74 at a point offset vertically from the pivot 76 while the other end 104 is attached to a post 106 above the pendulum in vertical alignment with the pivot. The post 106, which is fixed to the control box 108, is spaced above the point 102 by an amount greater than the spaced relationship between the spring ends so that the spring will be mounted in its tensioned relationship.

Additional protection for stabilization of the pendulum is achieved by mounting the pivot 76 and a major portion of the pendulum within the enclosed control box 108 with an elongate slot 110 in the bottom wall 112, in vertical alignment with the pivot 72, to enable rocking movement of the pendulum about its pivot while the lower portion extends downwardly through the slot for engagement by the control wire 62.

Thus the pendulum is fully protected against the wind effect while remaining free to swing in response to dampened movement of the alignment and/or safety wire. The switch means in position operatively to be engaged by the pendulum are also mounted for protection within the control box.

It has been found that the position of the control and safety wire is often materially affected by the wind whereby substantial error can be introduced into the means for alignment of the support towers.

To compensate for the wind effect, vanes 114 facing in the direction of movement of the support tower are provided on the end portion of a lever arm 116 pivoted intermediate its ends at 118 to a frame arm, such as frame arm 80, while the other end is pivoted at 120 to an end portion of a connecting rod 122 pivotally mounted at the other end 124 to the pendulum, whereby the pendulum will be biased in the direction opposite wind movement by an amount which is proportional to the force of the wind. The amount of bias can be balanced to compensate for the wind effect on the control wire, by linear adjustment of the pivot arm 116 on the pivot 118, or by angular adjustment of the vane 114, or by replacement of the vane for size adjustment, or combinations of the above.

In the preferred practice of this invention, means are provided for limiting movement of the control wire, at the point of engagement, to substantially horizontal movement in a linear path in the direction of movement of the support tower, as distinguished from arcuate movement with the pendulum about its pivot.

For this purpose, use is made of a horizontally disposed connecting link 126 pivoted at one end 128 to the lower portion of the pendulum 74, offset from the pivot 76, while the other end 130 of the connecting link 126 is pivoted to the upper end portion of a rocker arm 132 which is suspended for rocking movement about an intermediate pivot 134 fixed to a stationary part 136 of the tower frame. The rocker arm 132 pivots about an axis which is parallel with the pivotal axis for the pendulum 74. The control wire 62 passes through an opening 136 through an intermediate portion of the connecting link 126. When, as in the preferred practice of this invention, the pivots 128 and 130 for the connecting link are at the same level, the center of the connecting link will travel along a linear parallel path in response to activation by the control and/or safety wire.

As illustrated in the drawings, the vane 114a, responsive to air flow or wind effect, can be located on the exposed lower end of the rocker arm 132 to effect displacement of the connecting link 126 in the direction opposite wind direction and in proportion to the force of the wind thereby to pre-position the connecting link in compensation for the direction in force of the wind on the control wire.

The motor switch means 83 and 85 can be located alongside the connecting link 126 for operation in response to link movement in one direction or the other, or the switch means can be located in the path of the pendulum, as previously described, for operation relative to swinging movement of the pendulum which, in turn, is responsive to relatively parallel movement of the connecting link.

Figure 5:
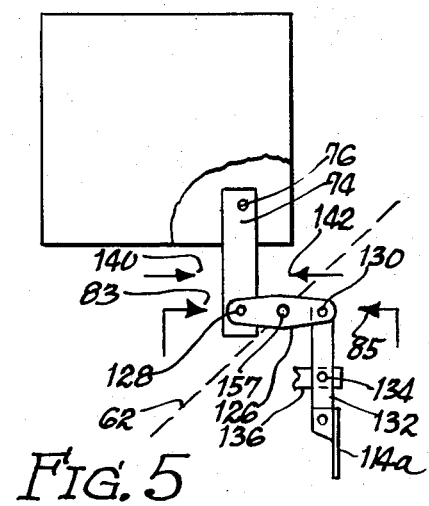
FIG. 5 is a schematic elevational view showing the pendulum and means for transmitting rocking movement of the pendulum into horizital linear movement for switch control.

Similarly, when a single wire 62 is used both for alignment control and as a safety wire, the grounded contacts 140 and 142 (in FIG. 5) can be positioned outwardly in spaced relation from the switch means 83 and 85 for subsequent engagement when the link 126 is offset by an amount to pass by the respective switch means in response to excessive misalignment of the particular tower relative to adjacent towers, thereby to inactivate the entire system.

It will be apparent that we have provided means for stabilization of the controls whereby smoother and more uniform operation can be achieved in the mobile irrigation system and whereby errors in operation can be materially minimized.

It will be understood that changes may be made in the details of construction, arrangement and operation without departing from the spirit of the invention, especially as defined in the following claims.

We claim:

1. In a mobile irrigation apparatus comprising an elongate horizontally disposed water distributor pipe, an inlet at one end for the introduction of water under pressure, a plurality of discharge nozzles spaced along said distributor pipe for spraying water as the distributor pipe is carried over the ground, a plurality of mobile supports in laterally spaced apart relation along the length of the distributor pipe for support of the pipe at corresponding laterally spaced apart portions, individual power operated drive means on each support for actuation of the mobile supports individually for movement in the forward or rearward directions, and means for maintaining alignment between adjacent supports comprising a cable extending substantially parallel to the distributor pipe and spaced therefrom, a pendulum vertically suspended from a pivot at its upper end fixed to the respective mobile support for free rocking movement of the pendulum about its pivot, an operative connection between the flexible cable and the pendulum at a portion offset from the pivot for rocking movement of the pendulum about its pivot in response to movement of the mobile support relative to adjacent supports, contacts in position to be engaged by the pendulum in response to movement of the support out of alignment with adjacent supports and means for dampening movement of the pendulum comprising resilient means operatively engaging the pendulum at a point offset from the pivot in alignment therewith.

2. An irrigation apparatus as claimed in claim 1 in which the means for dampening movement of the pendulum comprises a coil spring having one end connected to the pendulum above the pivot while the other end is connected to a fixed support vertically spaced from the connection to the pendulum by a distance greater than the normal length of the coil spring.

3. An irrigation apparatus as claimed in claim 2 which includes means to compensate for the wind effect on the cable comprising a wind vane and an operative connection between the vane and the pendulum to offset the pendulum by an amount to compensate for the wind effect on the cable.

4. An irrigation apparatus as claimed in claim 2 which includes means for protecting the controls against inadvertent movement comprising a control housing fixed to the mobile support having a bottom wall with an elongate slot extending lengthwise in alignment with the pendulum and means mounting the pendulum for rocking movement about its pivot with the major portion of the pendulum concealed within the housing and only a minor segment of the pendulum extending downwardly through the slot in the bottom wall for engagement with the control cable.

5. An irrigation apparatus as claimed in claim 4 in which the contacts responsive to pendulum movement by the cable are positioned within the housing alongside the pendulum.

6. In a mobile irrigation apparatus comprising an elongate horizontally disposed water distributor pipe, an inlet at one end for the introduction of water under pressure, a plurality of discharge nozzles spaced longitudinally along the distributor pipe for spraying water as the distributor pipe is carried over the ground, a plurality of mobile supports in spaced apart relation along the length of the distributor pipe for support of the distributor pipe, individual power operated drive means on each support for actuation of the mobile supports individually for movement in the forward or rearward directions, and means for maintaining alignment between adjacent supports comprising a flexible cable extending substantially parallel to the distributor pipe in spaced relation therewith and contacts in position to be engaged by the cable responsive to movement of the support out of alignment with adjacent supports, the improvement which comprises a link member between the contacts and operatively engaged by the cable, a pendulum suspended for free swinging movement from a pivot fixed to the tower, a pivotal connection between one end of the link member and a portion of the pendulum offset vertically from the pivot, a rocker arm mounted for free rotational movement about a pivot which is also fixed to the support offset from the pivot from the pendulum, and a pivotal connection between the other end of the link member and a portion of the rocker arm vertically offset from its pivot but at substantially the same level as the pivotal connection to the pendulum whereby the connecting link is horizontally disposed while being supported therebetween, and in which the contacts are in endwise alignment with the link member for engagement thereby responsive to movement of the mobile support out of alignment with adjacent supports.

7. An irrigation apparatus as claimed in claim 6 in which the rocker arm is pivoted intermediate its ends and which includes a wind vane connected to a portion of the rocker arm offset from the pivot whereby the link member will be offset by an amount fo compensate for the wind effect on the cable.

8. In a mobile irrigation apparatus comprising an elongate horizontally disposed water distributor pipe, an inlet at one end for the introduction of water under pressure, a plurality of discharge nozzles spaced longitudinally along the distributor pipe for spraying water as the distributor pipe is carried over the ground, a plurality of mobile supports in spaced apart relation along the length of the distributor pipe for support of the distributor pipe, individual power operated drive means on each support for actuation of the mobile supports individually for movement in the forward or rearward directions, and means for maintaining alignment between adjacent supports comprising a flexible cable extending substantially parallel to the distributor pipe in spaced relation therewith and contacts in position to be engaged responsive to movement of the support out of alignment with adjacent supports, the improvement which comprises a pendulum pivoted at one end portion and operatively engaged by the cable at a portion offset from the pivot for rocking movement of the pendulum about its pivot responsive to movement of the support out of alignment with adjacent supports and in position to engage said contacts, a vane mounted to face in the direction of movement of the mobile support and an operative connection between said vane and the pendulum to offset the pendulum by an amount to compensate for the wind effect on the cable.

* * * * *